US 7,852,581 B2

(12) United States Patent
Saito

(10) Patent No.: US 7,852,581 B2
(45) Date of Patent: Dec. 14, 2010

(54) METHOD AND SYSTEM FOR MEASURING SPACING IN A PERPENDICULAR MAGNETIC RECORDING

(75) Inventor: Kazuhiro Saito, Ogden, UT (US)

(73) Assignee: EMC Corporation, Hopkinton, MA (US)

( * ) Notice: Subject to any disclaimer, the term of this patent is extended or adjusted under 35 U.S.C. 154(b) by 812 days.

(21) Appl. No.: 11/781,739

(22) Filed: Jul. 23, 2007

(65) Prior Publication Data

US 2009/0027805 A1    Jan. 29, 2009

(51) Int. Cl.
    *G11B 27/36*    (2006.01)
(52) U.S. Cl. ...................................................... 360/31
(58) Field of Classification Search ........................ None
    See application file for complete search history.

(56) References Cited

U.S. PATENT DOCUMENTS 6,493,184 B1 * 12/2002 Smith ........................ 360/135
7,457,072 B2 * 11/2008 Dieron et al. ................ 360/75
2006/0209454 A1 * 9/2006 Kaizu et al. ............... 360/77.02

OTHER PUBLICATIONS

Bo Liu and Zhimin Yuan, "In-situ Characterization of Head-Disk Clearance," ASME Proceedings of Tribology Symposium on Interface Tribology towards 100 Gbit/in2 and Beyond, Oct. 1, 2000, pp. 51-58, Seattle, WA.
Zhen Jin et al., "Spinstand Measurement of Head Keeper Spacing in Perpendicular Recording," IEEE Transactions on Magnetics, , vol. 41, No. 10, pp. 2270-2272, Oct. 2006.

* cited by examiner

*Primary Examiner*—Joseph H Feild
*Assistant Examiner*—Huy D Nguyen
(74) *Attorney, Agent, or Firm*—Stephen C. Beuerle; Procopio Cory Hargreaves & Savitch LLP

(57) ABSTRACT

PMR spacing is measured by writing a pattern on a magnetic storage layer in non-return-to-zero notation, reading the pattern from the magnetic storage layer, analyzing a first harmonic component of the pattern that has a first amplitude, analyzing a second harmonic component of the pattern that has a second amplitude, measuring a ratio between the first and the second amplitudes of the first and second harmonic components, and determining a first spacing based on the ratio. In another embodiment, spacing is measured by analyzing a third harmonic component on the magnetic storage layer that has a third amplitude, measuring a difference in the amplitudes of the second and the third harmonic components while varying the first spacing and taking the ratio of the difference of the two each harmonic components.

31 Claims, 10 Drawing Sheets

METHOD AND SYSTEM FOR MEASURING SPACING IN A PERPENDICULAR MAGNETIC RECORDING

FIELD OF THE INVENTION

The present invention relates generally to perpendicular magnetic recording (PMR) and more specifically to measuring head media spacing (HMS) and head keeper spacing (HKS) in a PMR environment.

BACKGROUND

PMR is capable of delivering increased storage density as compared to longitudinal magnetic recording (LMR). Today there is interest in using PMR for hard disk drives (HDD). Current HDDs with LMR technology have an estimated limit of 100 to 200 gigabit per square inch due to the superparamagnetic effect. PMR technology is predicted to allow information densities of up to around 1 terabit per square inch (1000 gigabit per square inch).

One major challenge in designing magnetic information storage media is retaining the magnetization of the medium despite thermal fluctuations caused by the superparamagnetic limit. If the thermal energy is too high, there may be enough energy to reverse the magnetization in a region of the medium, destroying the data stored there. The energy required to reverse the magnetization of a magnetic region is proportional to the size of the magnetic region (where a larger magnetic region is more stable), as well as to the magnetic coercivity of the material. There is a minimum size for a magnetic region at a given temperature and coercivity. If it is any smaller it is likely to be randomly de-magnetized.

PMR uses higher coercivity material. This is possible because the head's write field penetrates the medium more efficiently in the perpendicular geometry. Hence, one advantage of PMR over LMR is that it achieves higher storage densities by aligning the poles of the magnetic elements, (which represent bits), perpendicularly to the surface of the disk platter.

FIGS. 1 and 2 are block diagrams showing PMR and LMR technologies for comparison. FIGS. 1 and 2 illustrate one advantage of PMR over LMR. FIG. 1 includes an LMR system 102 and FIG. 2 includes a PMR system 104. The LMR system 102 aligns bits horizontally on a storage layer 108. A writing element 103 (or write head) is responsible for determining the direction of each bit in the storage layer (either right or left), so that it can be used to represent a "0" or a "1" in binary notation.

The PMR system 104 aligns the bits perpendicularly on the storage layer 106. In the PMR system 104, the bits can be placed closer together on the storage layer 106, thus increasing the number of magnetic elements that can be stored in a given area.

The actual advantage of PMR is more complex, having to do with the use of a magnetically "stronger" (higher coercivity) material as the storage layer 106. This is possible due to the fact that in a perpendicular arrangement the magnetic flux 150 is guided through a magnetically soft (and relatively thick) underlayer 110 (or keeper layer) considerably thickening the total disk structure. This magnetically soft underlayer 110 can be effectively considered a part of the write head 112, making the write head 112 more efficient. Thus, the PMR system 104 makes it possible to produce a stronger write field gradient with essentially the same head materials as in the LMR system 102. Therefore, the PMR system 104 allows for the use of the higher coercivity storage layer 106.

A higher coercivity storage layer 106 is inherently thermally more stable, as stability is proportional to the product of bit (or magnetic grain) volume times the uniaxial anisotropy constant $K_u$, which in turn is higher for a material with a higher magnetic coercivity.

There are two essential spacing parameters in PMR, clearance or head media spacing (HMS) and head keeper spacing (HKS) although only HMS is defined in LMR. HMS measures the amount of space between the write head 112 and the storage layer 106. HKS measures the amount of space between the write head 112 and the soft magnetic underlayer 110. Typically, there is a non-magnetic interlayer 117 between the storage layer 106 and the underlayer 110 and its thickness comprises the HKS measurement. HKS is measured by varying HMS, for example, using a HMS varying module 152 as will be further defined subsequently.

There are known spacing loss equations that are used to measure HMS in an LMR technology. Current schemes in PMR seek to use the same spacing loss equations as approximations to measure HMS in PMR technologies as well. One basic difficultly, however, in using LMR based spacing loss equations as approximations to measure HMS in PMR is the limited range of wavelength where the approximation works well.

Traditional LMR technologies employ a measurement to be obtained by writing a test pattern to the storage layer, reading back the pattern, and analyzing the harmonic components of the pattern. The analysis of the harmonic components of the pattern comprises taking the amplitude ratio between any harmonic components for the sake of cancelling out the fluctuations caused by variables other than the spacing, such as media magnetic variation, off-track during the measurement, pre-amplification gain, or head sensitivity change over temperature, for example.

Thus, it has been common to write a rather long wavelength single tone and to take the ratio between first to third harmonic components in LMR. For example, a single tone may be written with a frequency of 6T (e.g., the tone has a frequency equivalent to six clock cycles) and taking the amplitude ratio between 6T and 2T.

The contribution of the additional media parameters of thickness of the storage layer 106 (d) and of the thickness of the interlayer (t) to the spacing loss equations in PMR becomes less significant towards a shorter wavelength. Conventional methods to measure spacing in PMR then take the ratio of harmonics within the short wavelength range.

One known solution was to take the ratio between the higher harmonics of a long wavelength single tone. This method works fairly well to estimate HMS by taking the ratio of amplitude difference between the third and fifth harmonics, such as taking a ratio between (10/3)T and 2T of a 10T single tone. This method, however, suffers from sensitivity to noise in the measurement system because the amplitude of the fifth harmonic is small. Only expensive equipment such as the spectrum analyzer can overcome the difficulty in analyzing the signal in this manner.

Another solution was not to use the single tone but to write the pattern "111100" in non-return-to-zero (NRZ) notation to the magnetic storage layer, to read back the pattern, and to analyze the 3T and 1.5T harmonics in the read back pattern. Noise is a problem with this method also, however. The 1.5T amplitude harmonic is usually lower than the 3T amplitude harmonic by more than 12 decibels and tends to be sensitive to the noise. This problem can only be alleviated as before by expensive equipment (such as a spectrum analyzer) for the analysis required to perform the measurement. Neither of the two methods above mentioned work for HKS measurements due to the absence of a lower harmonic component that contains the most amount of contribution of the soft underlayer (keeper) during the write process.

One solution in the above methods to obtain the HKS is to write an additional pattern to a separate portion of the magnetic storage layer or to re-write a separate pattern to the same portion of the magnetic layer, and analyze it separately. This solution is inadequate, however, because the magnetic storage layer is never perfectly uniform and never magnetized perfectly. Therefore, local variations in the magnetic storage layer will make the HMS and HKS measurements less accurate when measured using separate patterns on separate portions of the magnetic storage layer. Therefore, what is needed is a system and method that reduces or overcomes these significant problems found in the conventional solutions as described above.

SUMMARY

Embodiments herein are directed to measuring spacing in a perpendicular magnetic recording (PMR). In one embodiment, PMR spacing is measured by writing a pattern on a magnetic storage layer in non-return-to-zero (NRZ) notation, reading the pattern from the magnetic storage layer, analyzing a first harmonic component of the pattern that has a first amplitude, analyzing a second harmonic component of the pattern that has a second amplitude, measuring a ratio between the first and the second amplitudes of the first and second harmonic components, and determining a first spacing based on the ratio.

In one embodiment, the first harmonic component has a frequency that is two times a frequency of the second harmonic component and the ratio between the first amplitude and the second amplitude is less than 12 decibels. In another embodiment, the NRZ pattern is fourteen bits. In another embodiment, the pattern is 11100010110010. The measured spacing can be a head media spacing (HMS). The measurement can be performed using a digitizing scope or a spectrum analyzer, for example.

In another embodiment, spacing is measured by analyzing a third harmonic component of the same pattern on the magnetic storage layer that has a third amplitude, measuring a ratio of a difference between the second and the third amplitudes of the second and third harmonic components, and determining the spacing based on the ratio. The measured spacing can be a head keeper spacing (HKS).

In one embodiment, the second harmonic component has a frequency that is two times a frequency of the third harmonic component and the third amplitude is between the first amplitude and the second amplitude and the ratio between the second amplitude and the third amplitude is less than 12 decibels. In yet another embodiment, the first amplitude is 7T, the second amplitude is 3.5T, and the third amplitude is 1.75T. The 14-bit pattern provides a fundamental repetition cycle of 7T. Thus, one embodiment name the fundamental frequency component 7T as the first amplitude, the second harmonic component 3.5T as the second amplitude, and the third harmonic component 1.75T as the third amplitude.

One advantage to the invention is that both HMS and HKS can be measured by analyzing a single pattern written to a single portion of the HDD. This eliminates the need to write two separate patterns to two different portions of the HDD to calculate both HMS and HKS. This also alleviates the problem associated with non-uniformity of magnetization of the surface of the magnetic storage layer of the HDD, which can interfere with HMS and HKS measurement accuracy when writing the pattern to two different portions of the magnetic storage layer. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
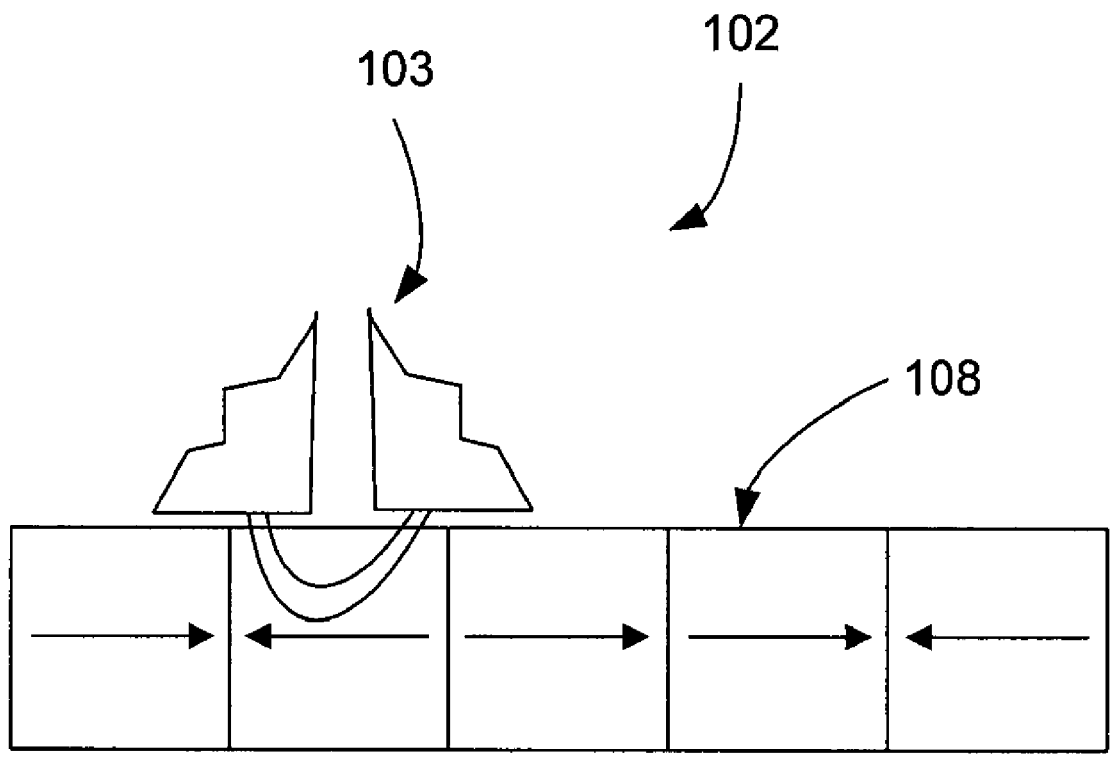
FIG. 1 is a block diagram showing an LMR technology.

Certain embodiments as disclosed herein provide for a method and system for measuring spacing in a perpendicular magnetic recording (PMR). After reading this description, it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

There are two pertinent measurements for the design, testing, and/or setting up of a PMR device such as a hard disk drive (HDD). One measurement is head media spacing (HMS), which measures the distance between the write head and the storage layer where the magnetic bits are encoded. Another measurement is head keeper spacing (HKS) which measures the spacing between write head and the soft magnetic keeper layer.

The HMS measurement fine-tunes a design issue for PMR technologies where the head should be as close as possible to the storage layer but cannot touch the storage layer. When the head is closer to the storage layer, the HDD performs better. When the head touches the storage layer, the HDD becomes unreliable. By measuring the HMS, the designers of the HDD can produce a drive that meets the performance and reliability requirements by having an optimized HMS. Typically, the optimized HMS is in the area of 3 to 4 nanometers, although this spacing can change depending on the type of HDD.

The HKS measurement fine-tunes another design issue for PMR technologies where the interlayer thickness should be such that the head is able to write effectively to the storage layer. In a PMR technology, the keeper layer works as a flux path during the writing of the bits in the storage layer. The spacing to the keeper layer is therefore essential in PMR technologies since it functions as a portion of the write head. If the write head is unreliable, then the data cannot be read back from the HDD.

HMS and HKS are measured using different equations while both are derived from the one exact spacing equation of PMR and then appropriately approximated for the practical usage. As will be further explained below, HMS is preferably measured using a shorter wavelength. A shorter wavelength means the bits written to the storage layer are physically closer together (e.g., the signal on the storage layer is high density). HKS is preferably measured using a wavelength. It is also preferable to measure HMS and HKS from the same pattern written to the same portion of the storage layer because different portions of the storage layer may not be uniform, which can skew the results. Thus, the difficulty is to write a single pattern to the storage layer that is suitable for both HMS and HKS measurements in PMR.

HMS is measured in LMR technologies using a known spacing loss equation called the Wallace equation. The Wallace equation is shown in Equation 1:

$$\text{Amplitude} = \exp(-2\pi \cdot HMS/\lambda) \qquad \text{Equation 1}$$

where HMS is Head Media Spacing, and
$\lambda$ is wavelength

It is convenient to define the spacing sensitivity because it is common to measure the amplitude in decibels. Equation 2 shows a common definition of spacing sensitivity in decibels and how it relates with wavelength:

$$\text{nm/dB} = \lambda/\{2\pi \cdot 20\text{Log}10(e)\} = \lambda/54.6 \qquad \text{Equation 2}$$

It is also known that taking the ratio of amplitudes between harmonics gives the robustness of the measurement because it cancels out the variations of the amplitudes caused by the non-spacing origins, such as the fluctuation of media magnetics, off-track during the measurement, the head sensitivity change, or the gain change in pre-amplification over temperature. The spacing sensitivity for the amplitude ratio between mth and nth harmonics (where wavelengths of mth and nth harmonics are denoted $\lambda m$ and $\lambda n$, respectively) is shown in Equation 3

$$\text{nm/dB} = \lambda \text{ ratio}/54.6, \qquad \text{Equation 3}$$

where $\lambda$ ratio=$1/(1/\lambda m - 1/\lambda n) = \lambda m \cdot \lambda n/(\lambda n - \lambda m)$.

On the other hand, the spacing loss in PMR for the media with the soft magnetic underlayer is given in Equation 4

$$\text{Amplitude} = [\sinh\{(2\pi \cdot (t+d)/\lambda\} - \sinh(2\pi \cdot t/\lambda))/ \\ [\sinh\{2\pi \cdot (HMS+t+d)/\lambda\}], \qquad \text{Equation 4}$$

where HMS is Head Media Spacing,
$\lambda$ is wavelength,
t is interlayer thickness, and
d is magnetic layer thickness.

The equation is more complicated than LMR because it includes the two media parameters explicitly, interlayer thickness: t and magnetic layer thickness: d. Interlayer and magnetic layer thickness are usually unknown or only nominally known when spacing is measured. In addition, the spacing sensitivity for the amplitude ratio in PMR is not obtained as a simple formula as in LMR. It is common practice, therefore, to use the shorter wavelength for the measurement, where the contributions of t and d get negligible and then applying the same Wallace equation with LMR, as a reasonable approximation is sufficient.

In summary, the Wallace equation provides a desirable approach for measuring HMS in an LMR technology. The Wallace equation can also be used to measure HMS in PMR technology, but its accuracy is reduced as the wavelength increases. Therefore, to use the Wallace equation to measure HMS in a PMR technology, a high-density media provides better results, meaning the perpendicular bits need to be as close together as possible. Typically, a wavelength for the bits of 50 to 150 nanometers works well.

Figure 3:
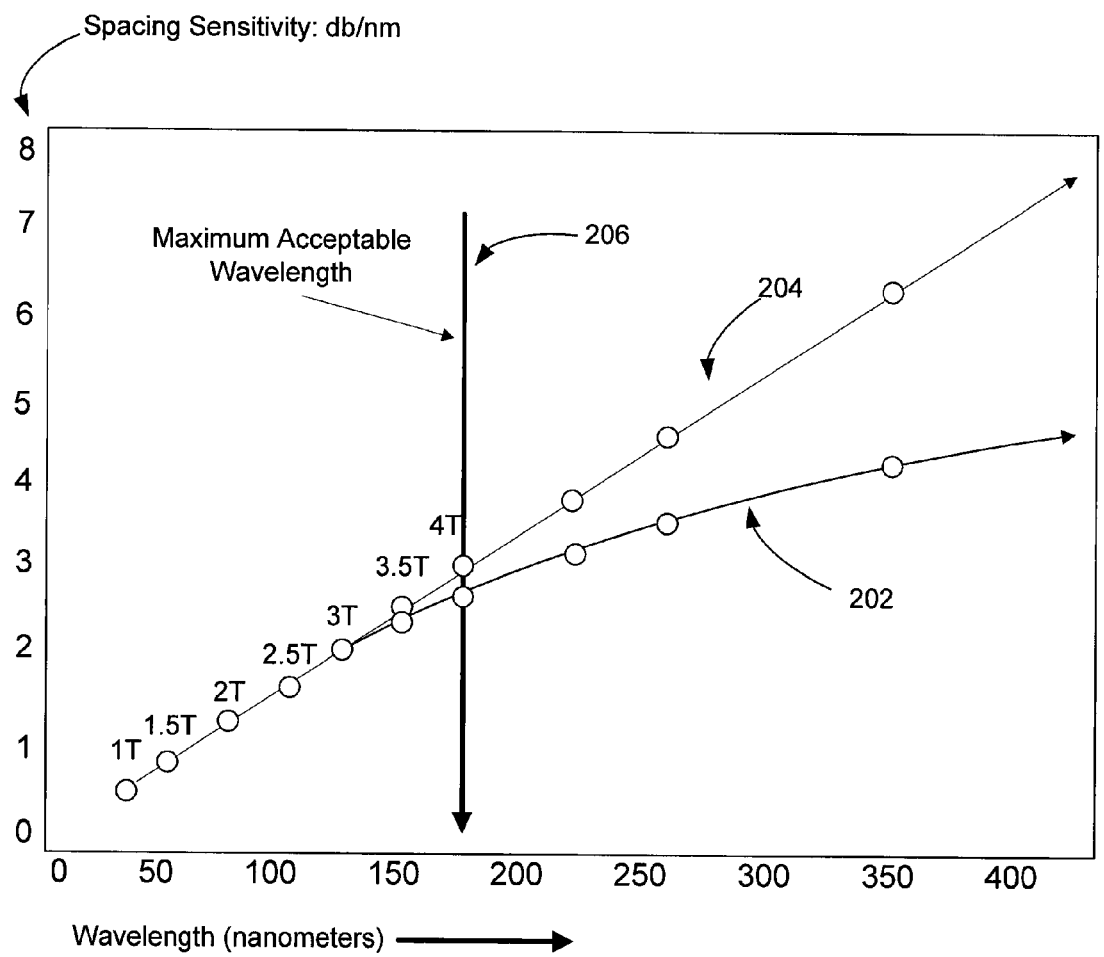
FIG. 3 is a chart showing an example of spacing loss sensitivity for PMR and LMR technologies.

The high-density signal required in the PMR technology to use the Wallace equation for an HMS measurement suffers from a noise problem. As the signal is packed more densely, the measurement gets noisier and is hence less accurate. FIG. 3 is a chart showing an example spacing loss sensitivity for PMR and LMR technologies at various wavelengths. FIG. 3 illustrates how the PMR measurement becomes difficult as the wavelength increases. In the example of FIG. 3, the range of short wavelengths that can be applied using the Wallace equation is estimated. In FIG. 3, the interlayer thickness (t) is given as 18 nanometers and the magnetic layer thickness (d) is given as 15 nanometers.

The x-axis of FIG. 3 denotes wavelength in nanometers (nm) and the y-axis denotes spacing sensitivity in nm/db. The increase in wavelength along the x-axis corresponds to an increase in the wavelength of the bits in the magnetic storage layer of the HDD. The PMR plot 202 and the LMR plot 204 diverge significantly to the right of the maximum acceptable wavelength 206. So, for example, as the spacing becomes larger than 4T (e.g., 4 clock cycles), the Wallace equation gets more and more inaccurate to measure HMS in the PMR technology with the given values of (t) and (d). Correspondingly, the use of the Wallace equation to measure HMS in a PMR technology is feasible wavelengths (e.g., the distance between the bits) of less than the maximum acceptable wavelength 206 (4T).

Figure 4:
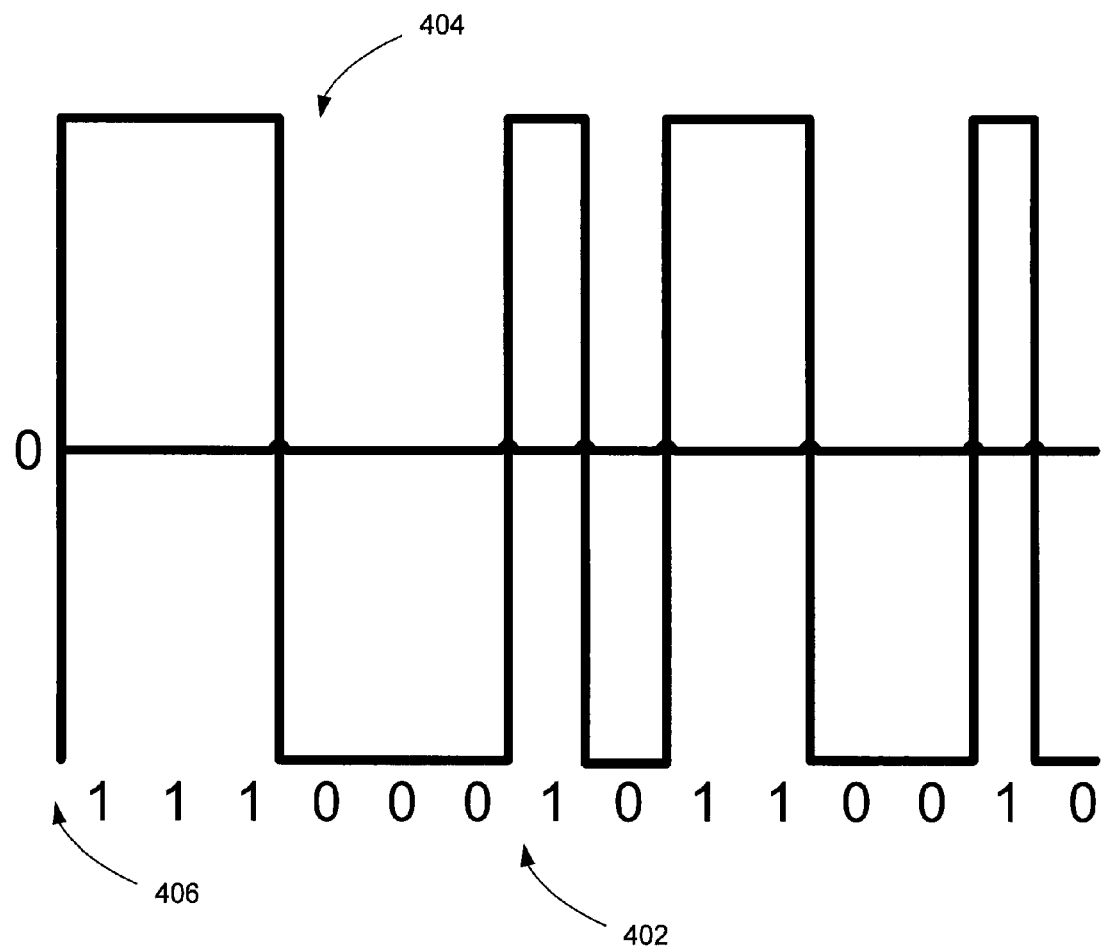
FIG. 4 is a diagram showing a pattern written in NRZ notation according to an embodiment of the present invention.

FIG. 3 shows that an approximation of better than 5% under 1150 k bits per inch (44 nm of the minimum wavelength per pair of bits) needs 4T or shorter harmonic components. To achieve the robustness of measurement in PMR similar to LMR forces the choice of a pair of harmonics that are less than 4T, or preferably 3.5T. Thus, as FIG. 3 shows, a pattern is needed that gives the sufficient amplitudes for the two harmonic components in the range less than the wavelength corresponding to 4T for an HMS measurement, FIG. 4 is a diagram showing a pattern in NRZ notation according to an embodiment of the present invention. The pattern 402 is capable of being written to the magnetic storage layer of the HDD such that it is capable of operating within the constraints outlined in FIG. 3. In FIG. 4, the pattern 402 is a binary code in which "1's" are represented by one significant condition 404 and "0's" are represented by the other significant condition 406, with no other neutral or rest condition. The pulses do not have a rest state, which means a synchronization (or clock) signal is also sent alongside the pattern 402. In the present embodiment, the pattern 402 is a fourteen bit pattern.

In the pattern 402 "1" is represented by one physical level (such as a DC bias on the transmission line) and "0" is represented by another level (usually a positive voltage). In clock language, "1" transitions or remains low on the trailing clock edge of the previous bit and "0" transitions or remains high on the trailing clock edge of the previous bit, or just the opposite. This allows for long series without change. The pattern 402 of FIG. 4 can be used as the test pattern to be read back and analyzed to find HMS and HKS simultaneously by analyzing 3.5T, 7T, and 1.75T harmonic components as will be further defined below.

Figure 5:
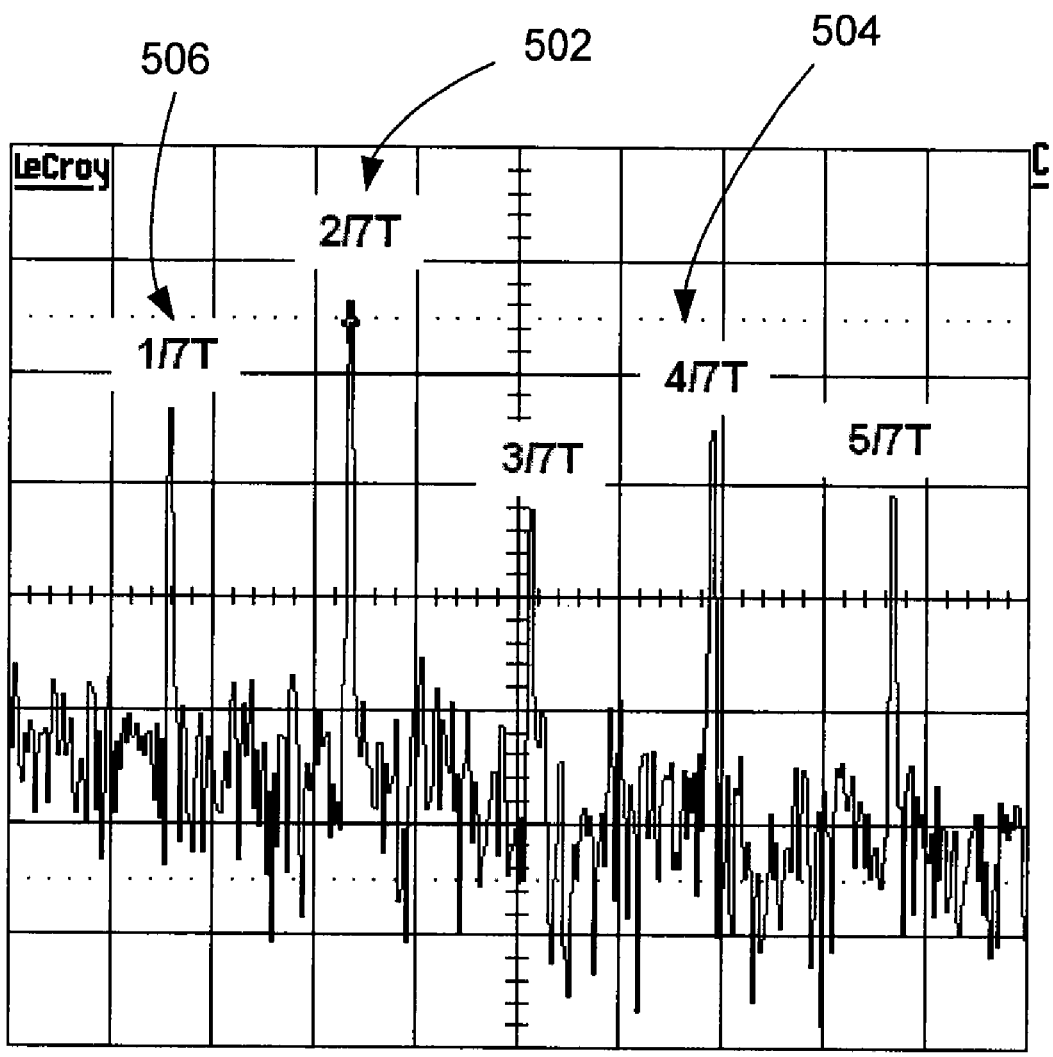
FIG. 5 is a chart showing a fast Fourier transform (FFT) of the pattern in FIG. 4 according to an embodiment of the present invention.

FIG. 5 is a chart showing a fast Fourier transform (FFT) of the pattern in FIG. 4 according to an embodiment of the present invention. The FFT of the pattern 402 is an analysis of the amplitude of the harmonic components found when playing back the pattern when written to the storage layer of the HDD. The FFT of the pattern 402 illustrates that it is a sufficiently dense signal with the properties needed to apply the Wallace equation to measure HMS. The FFT of the pattern 402 also shows that it has significant robustness to simultaneously measure HKS.

In FIG. 5, the x-axis represents the frequency, which is becoming shorter as the chart moves to the right. The y-axis represents the amplitude of a given harmonic component in the analyzed pattern 402. The pattern 402 (11100010110010) in NRZ notation gives the strongest amplitude in 3.5T (502). The amplitude of its second harmonic component 1.75T (504) is less than 12 decibels smaller than the amplitude 3.5T harmonic component (502) as demonstrated in FIG. 5. This reduces the noisiness of 3.5T harmonic component (502) substantially.

Another property of the pattern 402 is that the longer wavelength harmonic component 7T (506) has an amplitude that is in between those of the 3.5T (502) and the 1.75T (504) harmonic components. This enables the use of the 7T harmonic component (506) for an HKS measurement as will be further defined below. This also enables both the HMS and HKS measurements to be performed using the same pattern written to the same portion of the storage layer on the HDD. This eliminates any problem associated with writing two different patterns to two different portions of the storage layer (e.g., non-uniformity of the HDD), which can interfere with accurate measurements.)

It is known that HKS=HMS+t+d can be estimated by taking the ratio of the amplitude delta of the two harmonics caused by varying HMS. The expression given for in between the mth and nth harmonic components is shown in Equation 5

$$[\Delta\text{amplitude}(mth)/\Delta\text{amplitude}(nth)]=[\tanh\{2\pi^*(HKS)/(\lambda/N)\}]/[(n/m)^* \tanh\{2\pi^*(HKS)/\lambda\}] \quad \text{Equation 5}$$

Figure 2:
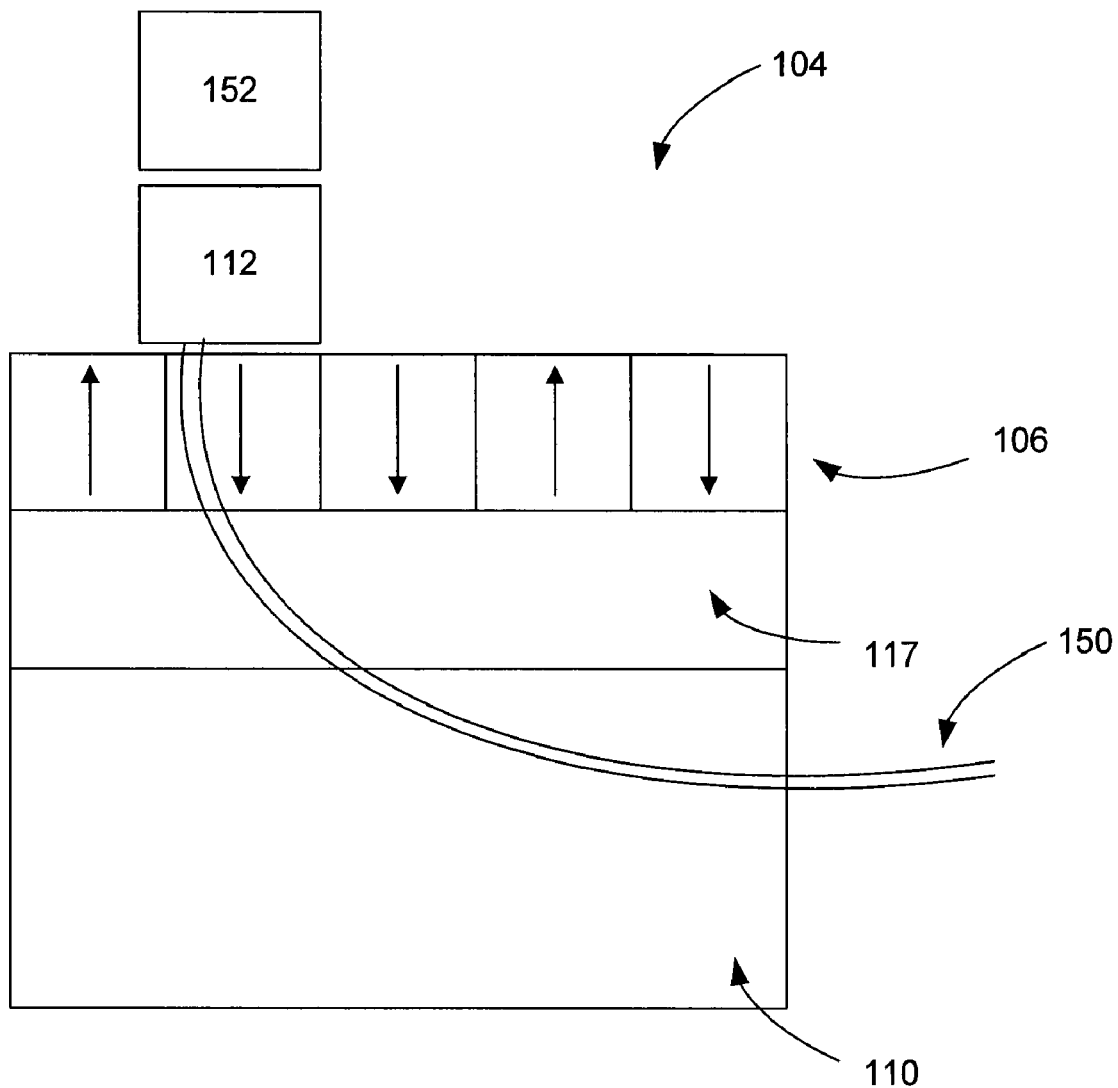
FIG. 2 is a block diagram showing a PMR technology.

Delta amplitude of certain harmonic components in Equation 5 are obtained by varying the HMS by some means. Referring back to FIG. 2, for example, the HMS varying module 152 can be used. The HMS varying module 152 can vary the HMS using air pressure, for example. Alternatively, the HMS varying module 152 can include a micro-heater element embedded in the write head 112. A preamp used for the write head 112 (not shown) has an adjustable power supply driving the micro-heater.

Figure 6:
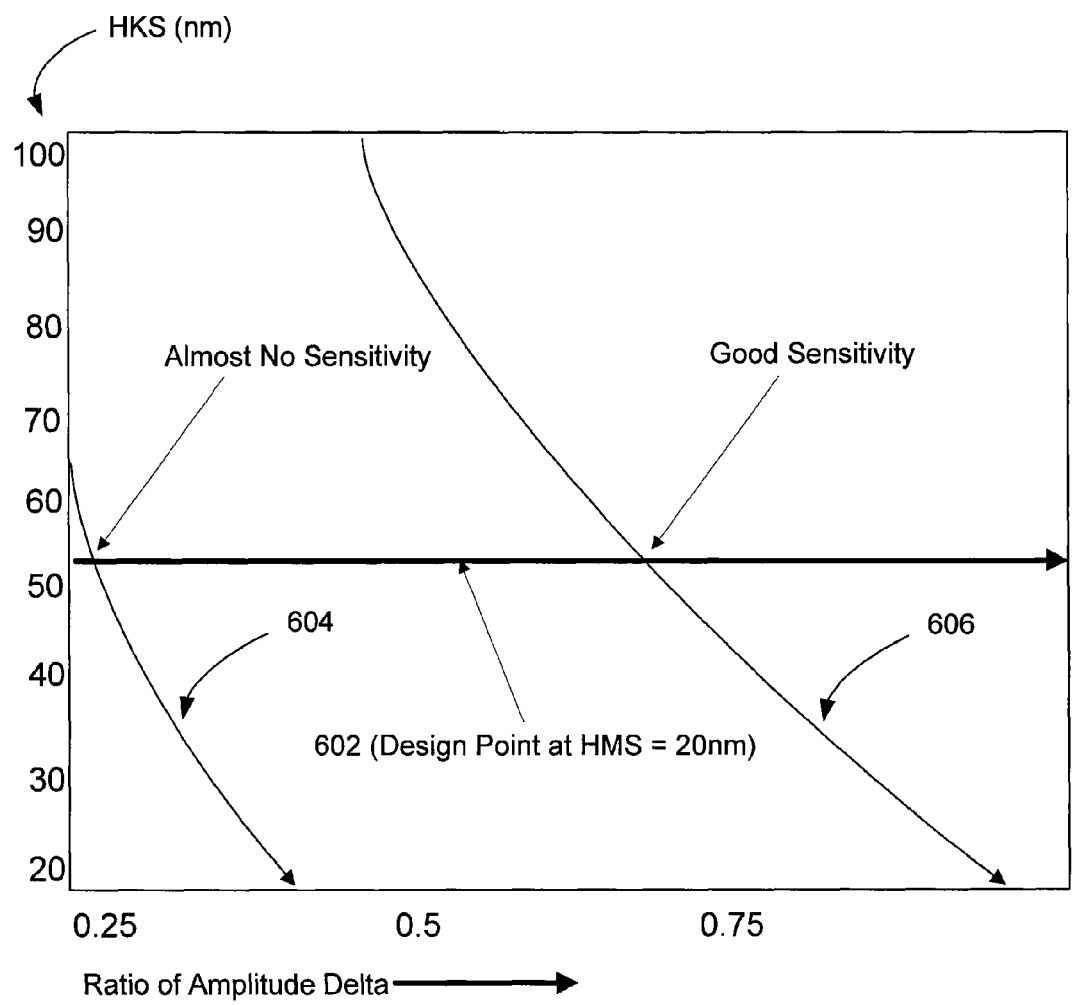
FIG. 6 is a chart showing the difference in ratio versus the HKS measurement according to an embodiment of the present invention.

Equation 5 is valid for any wavelength ($\lambda$) and indicates that the rather long wavelength as the lower order of harmonics (mth in the above expression) is needed for the better sensitivity. The calculated sensitivity is compared between the 7T harmonic component (506) and the 3.5T harmonic component (504) with the 3.5T harmonic component (504) and the 1.75T harmonic component (502) in FIG. 6, FIG. 6 is a chart showing the difference in ratio versus the HKS measurement according to an embodiment of the present invention. In the chart of FIG. 6, the x-axis represents the ratio of the amplitude delta between the two harmonic components being analyzed. The y-axis represents HKS in nanometers. A design point of HKS 602 is shown, which represents HKS at 54 nanometers under HMS at 20 nanometers. Two curves are shown. The curve 604 is a representation of HKS vs. the ratio of the delta between the 3.5T harmonic component (504) and the 1.75T harmonic component (502). The curve 606 is a representation of HKS vs. the ratio of the delta between the 7T harmonic component (506) and the 3.5T harmonic component (504).

As FIG. 6 shows, the curve 604 has almost no sensitivity at the design point 602, and is therefore not suitable for an HKS measurement. The curve 606, however, has very good sensitivity at the design point 602, and is suitable for an HKS measurement. Thus, the pattern 402 (11100010110010) gives useful harmonic components for both HMS measurements and HKS measurements in PMR. One aspect of the nature of the pattern 402 or another suitable pattern used for such a simultaneous HMS and HKS measurement is that it is fourteen bits. The fourteen-bit pattern is robust enough to make it possible to utilize the 7T harmonic component to perform the HKS measurement.

Figure 7:
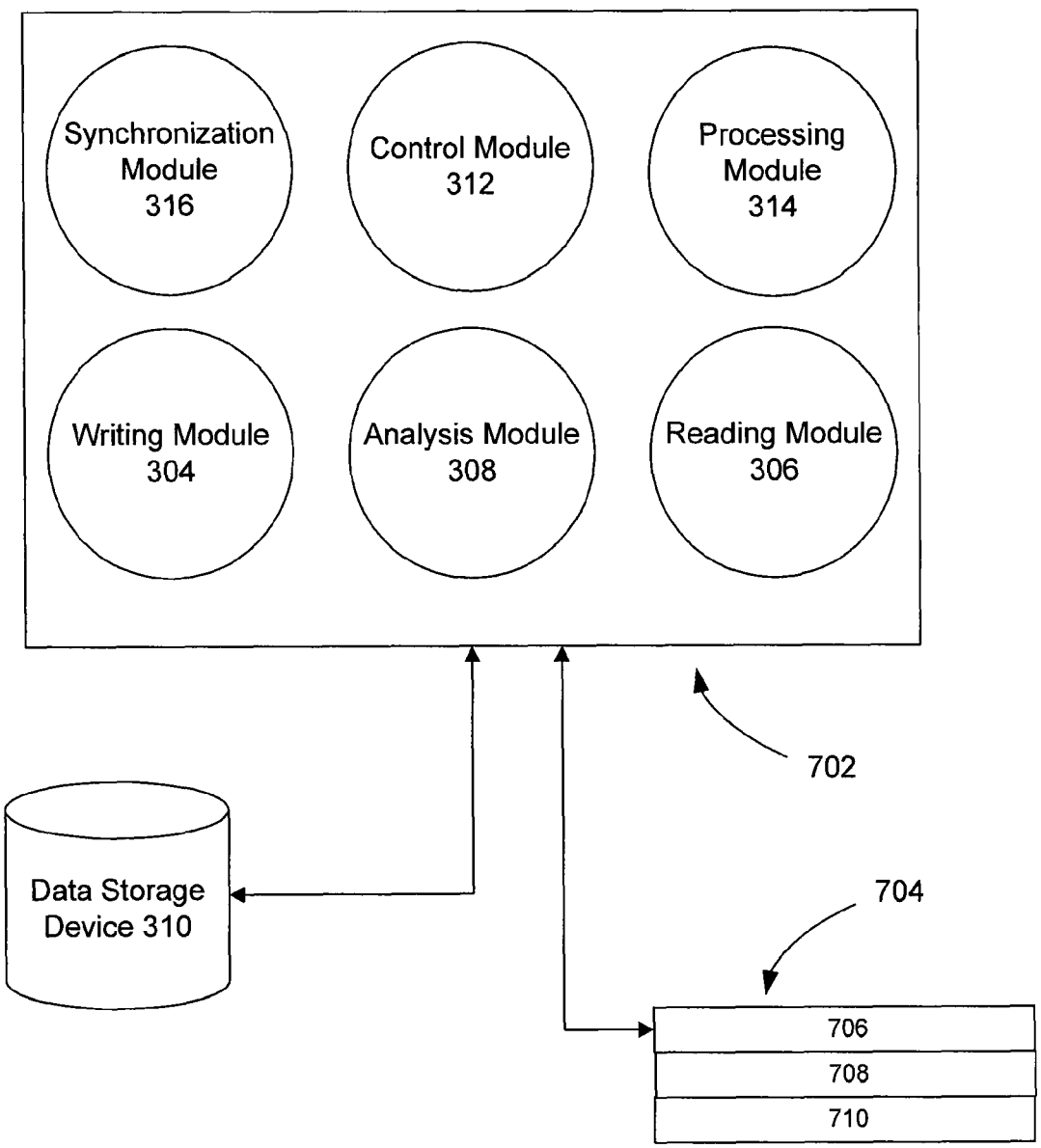
FIG. 7 is a diagram showing a PMR spacing measurement apparatus according to an embodiment of the present invention.

FIG. 7 is a diagram showing a PMR spacing measurement apparatus according to an embodiment of the present invention. The PMR spacing measurement apparatus 702 is connected to a data storage device 310. The data storage device 310 can be a database, a data file, or other data storage system for storing information used by the PMR spacing measurement apparatus 702. The data storage device 310 includes, for example, the algorithms needed to make calculations using one or more of Equations 1-5, data associated with the amplitudes of the pattern read back from an HDD 704, the data to write the pattern itself to the magnetic storage layer of the HDD 704, etc.

The PMR spacing measurement apparatus 702 further includes a reading module 306, a writing module 304, an analysis module 308, a processing module 314, a control module 312, and a synchronization module 316. The HDD 704 includes the magnetic storage layer 706, a non-magnetic interlayer 708, and a magnetic underlayer 710. The magnetic storage layer 706 is typically a high coercivity alloy containing one or more of cobalt, chromium, platinum, silicon, or oxygen. The magnetic underlayer 710 is typically a low coercivity (or soft magnetic) alloy containing one or more of cobalt, tantalum, zirconium, or chromium. The spacing between the magnetic storage layer 706 and the magnetic underlayer 710 is the interlayer thickness. The spacing between the write head and the magnetic underlayer 710 is the HKS. There may be other elements to the PMR spacing measurement apparatus 702 and the HDD 704, which are not shown. These elements are generally known to those having ordinary skill in the art, so they have been omitted for clarity purposes.

The writing module 304 can be a component of a write head used to write data or a pattern to the HDD 704. The spacing between the write head and the magnetic storage layer 706 is the HMS. The writing module 304 is configured to operate in accordance with PMR technology, including guiding a magnetic flux through the magnetic underlayer 710 (or keeper) to modify bits in the magnetic storage layer 706 by orienting the direction of their magnetism either up or down to represent a "0" or a "1" in binary notation. The writing module 304 is used to write the fourteen bit pattern and the actual data stored in the HDD to the magnetic storage layer 706. The writing module 304 may be provided with instructions from data in the data storage device 310 as to how to write the pattern and which bits need to be oriented in which direction.

The reading module 306 can be a component of a read head (which may be the same head as the write head) used to read back data or the pattern from the HDD 704. The control module 312 receives instructions, which can be stored in the data storage device 310. The instructions are used to control the operations of the PMR spacing measurement apparatus 702. For example, the control module 312 may control the writing module 304 when it writes the pattern to the HDD 704. Likewise, the control module 312 may control the reading module 306 when it reads back the pattern from the HDD 704.

The synchronization module 316 includes a clock. The clock synchronizes the components of the PMR spacing measurement apparatus 702 to work together. For example, the clock provides a reference when writing the pattern to the HDD 704 or when reading it back. It also provides a reference for the wavelength of the bit-to-bit separation on the magnetic storage layer 706 of the HDD 704.

The analysis module 308 can include one or more of a digitizing scope or a spectrum analyzer. The analysis module 308 is configured to analyze the pattern when it is read back by the reading module 306. The analysis module can identify the harmonic components within the analyzed pattern for further processing to measure HMS and/or HKS.

The processing module 314 can receive the analyzed harmonic components from the analysis module 308. The processing module can apply the data associated with the analyzed harmonic components and process the data to determine the actual values for HMS and HKS. For example, the processing module can apply the Wallace equation to the appropriate pair of harmonics and using the values of the amplitudes as provided by the analysis module 308, the processing module can determine the HMS. In general, the processing module is configured to process the analyzed pattern to determine HMS and/or HKS using Equations 1-5 or other equations suitable for determining HMS and/or HKS.

Figure 8:
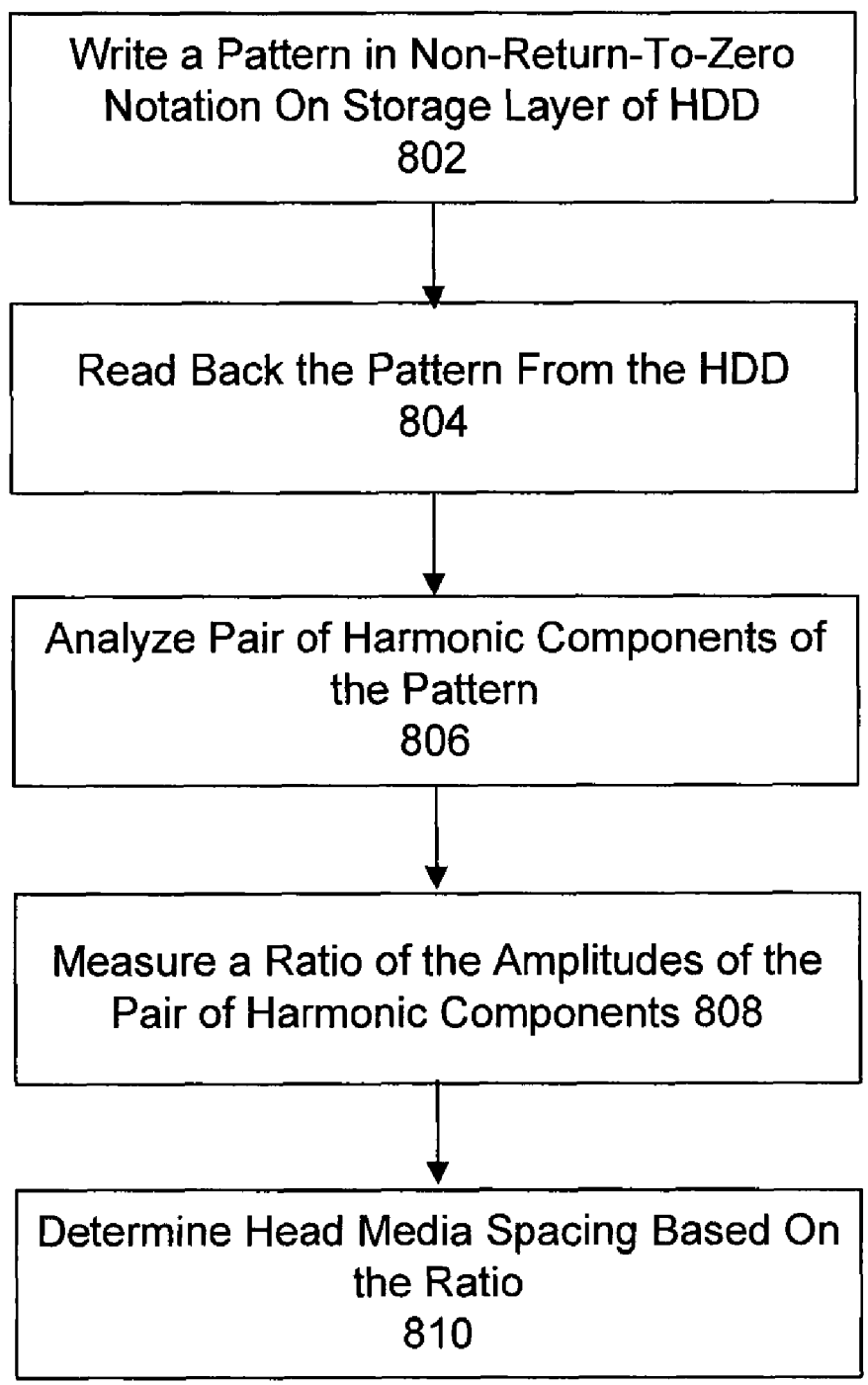
FIG. 8 is a flowchart showing an HMS measurement according to an embodiment of the present invention.

FIG. 8 is a flowchart showing a HMS measurement according to an embodiment of the present invention. At step 802, the writing module 308 writes a pattern in NRZ notation on a magnetic storage layer of an HDD. In one embodiment, the pattern is a fourteen-bit pattern such as 11100010110010. At step 804, the reading module 306 reads back the pattern from the HDD. At step 806, the analysis module analyzes the appropriate pair of harmonic components of the pattern. This can include, for example, obtaining an FFT of the read back pattern using a digitizing scope. At step 808, the processing module 314 calculates a ratio of the amplitudes of the first and the second harmonic components and at step 810, the processing module determines the HMS based on the ratios calculated at step 808.

Figure 9:
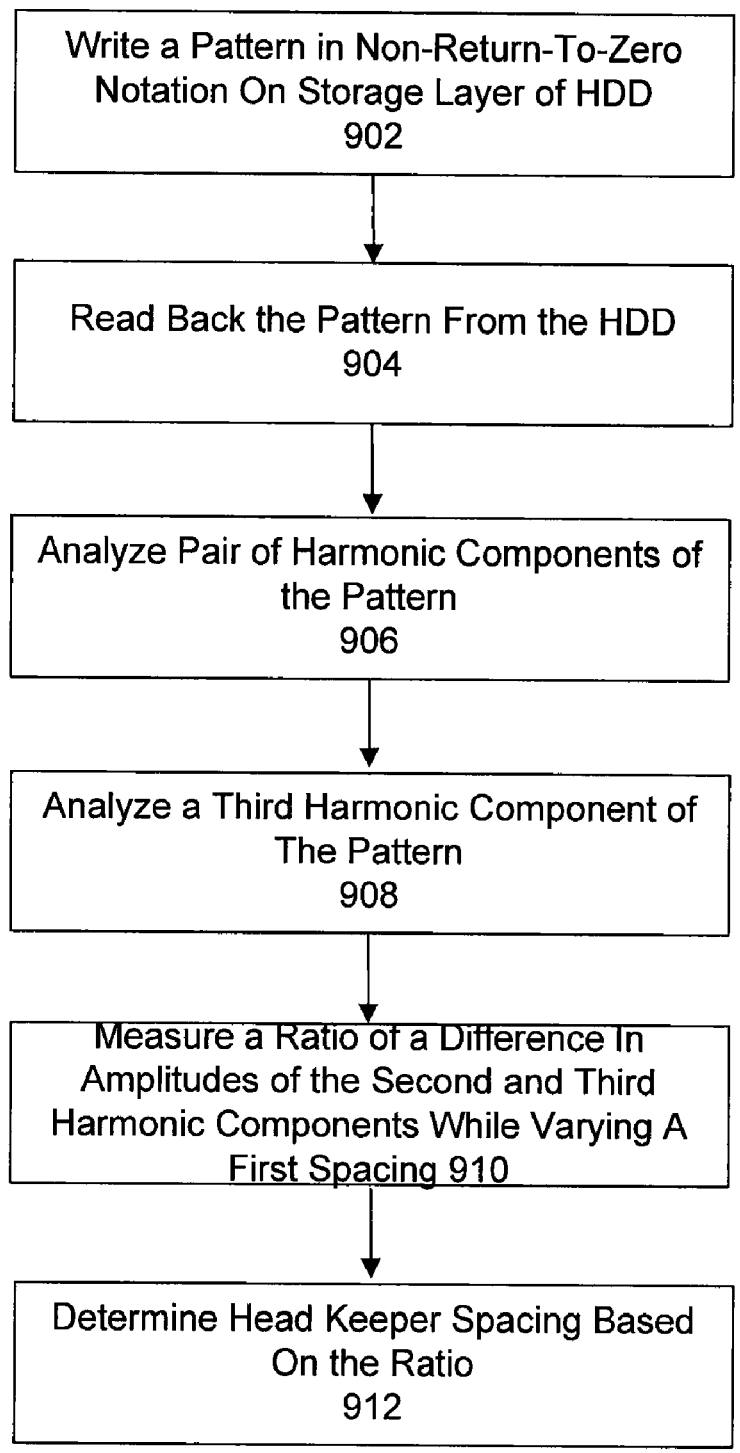
FIG. 9 is a flowchart showing an HKS measurement according to an embodiment of the present invention.

FIG. 9 is a flowchart showing a HKS measurement according to an embodiment of the present invention. At step 902, the writing module 308 writes a pattern in NRZ notation on a magnetic storage layer of an HDD. In one embodiment, the pattern is a fourteen-bit pattern such as 11100010110010. At step 904, the reading module 306 reads back the pattern from the HDD. At step 906, the analysis module analyzes appropriate pair of harmonic components of the pattern. This can include, for example, obtaining an FFT of the read back pattern using a digitizing scope.

At step 908, the analysis module analyzes a third harmonic component of the pattern. At step 910, the processing module 314 calculates a ratio of a difference in the amplitudes of the second and the third harmonic components while varying a first spacing (e.g., HMS). At step 912, the processing module determines the HKS based on the ratios of the difference calculated at step 910.

Figure 10:
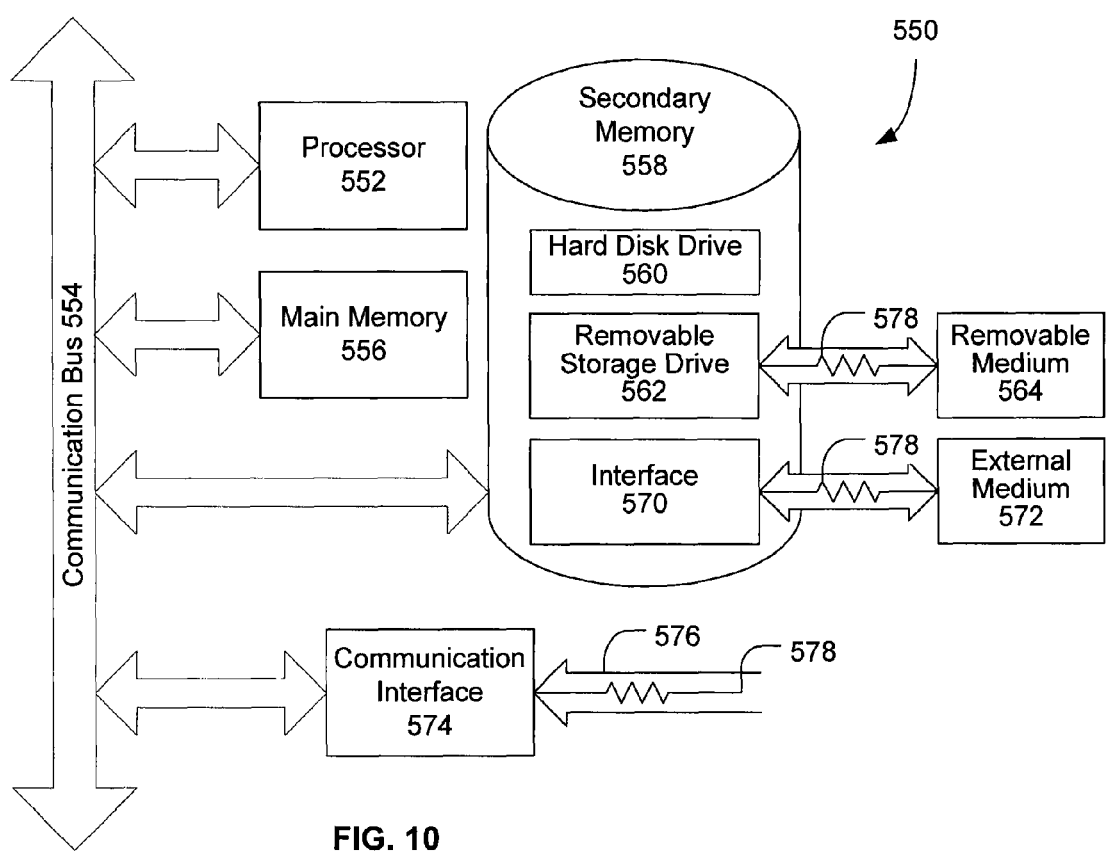
FIG. 10 is a block diagram illustrating an example computer system that may be used in connection with various embodiments described herein.

FIG. 10 is a block diagram illustrating an example computer system 550 that may be used in connection with various embodiments described herein. For example, the computer system 550 may be used in conjunction with the PMR spacing measurement apparatus 702 described in FIG. 7. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method for measuring a spacing in a perpendicular magnetic recording comprising:
    writing a pattern on a magnetic storage layer in non-return-to-zero notation;
    reading the pattern from the magnetic storage layer;
    analyzing a first harmonic component that has a first amplitude using the pattern;
    analyzing a second harmonic component that has a second amplitude using the pattern;
    measuring a ratio between the first and the second amplitudes of the first and second harmonic components; and
    determining a first spacing based on the ratio,
    wherein the first harmonic component has a frequency that is two times a frequency of the second harmonic component and the ratio between the first amplitude and the second amplitude is less than 12 decibels.

2. The method of claim 1 wherein the pattern is fourteen bits.

3. The method of claim 1 wherein the first spacing is a head media spacing (HMS).

4. The method of claim 1 wherein the steps of analyzing further comprises using a digitizing scope or a spectrum analyzer.

5. The method of claim 1 further comprising:
    analyzing a third harmonic component that has a third amplitude using the pattern;
    measuring a difference in the amplitudes of the second and the third harmonic components while varying the first spacing;
    calculating a ratio of the difference of the second and the third harmonic components; and
    determining a second spacing based on the ratio,
    wherein the second harmonic component has a frequency that is two times a frequency of the third harmonic component and the third amplitude is between the first amplitude and the second amplitude and the ratio between the second amplitude and the third amplitude is less than 12 decibels.

6. The method of claim 5 wherein the second spacing is a head keeper spacing (HKS).

7. The method of claim 5 wherein the step of analyzing a third harmonic component further comprises using a digitizing scope or a spectrum analyzer.

8. The method of claim 5, wherein the pattern is written to a single portion of the magnetic storage layer.

9. The method of claim 1 wherein the first amplitude is 1.75T, the second amplitude is 3.5T, and the third amplitude is 7T.

10. The method of claim 1 wherein the pattern is 11100010110010.

11. A measuring system for a perpendicular magnetic recording comprising:
    a pattern written in non-return-to-zero notation on a magnetic storage layer, which is read back from the magnetic storage layer;
    a first harmonic component that has a first amplitude configured to be analyzed in the read back pattern;
    a second harmonic component that has a second amplitude configured to be analyzed in the read back pattern; and
    a measurement instrument configured to determine a ratio between the first and the second amplitudes of the first and second harmonic components and determine a first spacing based on the ratio,
    wherein the first harmonic component has a frequency that is two times a frequency of the second harmonic component and the ratio between the first amplitude and the second amplitude is less than 12 decibels.

12. The system of claim 11 wherein the pattern is fourteen bits.

13. The system of claim 11 wherein the first spacing is a head media spacing (HMS).

14. The system of claim 11 wherein the measuring instrument comprises a digitizing scope or a spectrum analyzer.

15. The system of claim 11 further comprising:
    a varying module;
    a third harmonic component that has a third amplitude configured to be analyzed in the read back pattern; and
    the measurement instrument further configured to measure a difference in the amplitudes of the second and the third harmonic components while the varying module varies the first spacing,
    the measurement instrument further configured to calculate a ratio of the difference of the second and the third harmonic components and determine a second spacing based on the ratio,
    wherein the second harmonic component has a frequency that is two times a frequency of the third harmonic component and the third amplitude is between the first amplitude and the second amplitude and the ratio between the second amplitude and the third amplitude is less than 12 decibels.

16. The system of claim 15 wherein the second spacing is a head keeper spacing (HKS).

17. The system of claim 15, wherein the pattern is written to a single portion of the magnetic storage layer.

18. The system of claim 11 wherein the first amplitude is 1.75T, the second amplitude is 3.5T, and the third amplitude is 7T.

19. The system of claim 11 wherein the pattern is 11100010110010.

20. A hard disk drive apparatus comprising:
    a magnetic storage layer having a relatively high coercivity;
    an underlayer having a relatively low coercivity;
    an interlayer between the magnetic storage layer and the underlayer configured to magnetically isolate the magnetic storage layer from the underlayer by a physical separation having a first spacing;
    a read and write head positioned near the magnetic storage layer but not touching the magnetic storage layer, wherein there is a second spacing between the read and write head and the magnetic storage layer, the read and write head configured to write a fourteen bit pattern on a single portion of the magnetic storage layer and to read back the fourteen bit pattern;
    an analysis module configured to analyze a first, a second, and a third harmonic component in the read back pattern, wherein the first harmonic component has a frequency that is two times a frequency of the second harmonic component and four times the frequency of the third harmonic component; and
    a processing module configured to compute the second spacing using the analyzed first and second harmonic components and to compute the first spacing using the second and third harmonic components.

21. The hard disk drive apparatus of claim 20 wherein the second spacing is a head media spacing (HMS).

22. The hard disk drive apparatus of claim 20 wherein the first spacing is a head keeper spacing (HKS).

23. The hard disk drive apparatus of claim 20 wherein the first harmonic component has a first amplitude and the second harmonic component has a second amplitude, and
wherein a first ratio between the first amplitude and the second amplitude is less than 12 decibels.

24. The hard disk drive apparatus of claim 23 wherein the third harmonic component has a third amplitude and the third amplitude is between the first amplitude and the second amplitude and a second ratio of a difference between the second amplitude and the third amplitude is less than 12 decibels.

25. The hard disk drive apparatus of claim 24 wherein the first amplitude is 1.75T, the second amplitude is 3.5T, and the third amplitude is 7T.

26. The hard disk drive apparatus of claim 23 wherein the first ratio is determined using the Wallace equation.

27. The hard disk drive apparatus of claim 20 wherein the fourteen bit pattern is 11100010110010.

28. The hard disk drive apparatus of claim 20 wherein the fourteen bit pattern comprises a plurality of individual bits, wherein each of the individual bits is written to the magnetic storage layer with a spacing of between 50 nanometers and 100 nanometers.

29. The hard disk drive apparatus of claim 20 further comprising a synchronization module including a clock signal, the clock signal configured to provide a reference for the read and write head to read back the pattern.

30. The hard disk drive apparatus of claim 20 wherein the magnetic storage layer comprises an alloy including one or more of cobalt, chromium, platinum, silicon, or oxygen.

31. The hard disk drive apparatus of claim 20 wherein the underlayer comprises an alloy including one or more of cobalt, tantalum, or chromium.

* * * * *